Oct. 13, 1970  F. M. BROWN ET AL  3,533,129
BONE PINNING MACHINE

Filed Nov. 8, 1968  2 Sheets-Sheet 1

INVENTORS
JESSE A. WILLCOX,
FRANK M. BROWN,
JEAN A. BURTON,
GERALD L. HELGESON

BY Williamson, Palmatier
& Bains  ATTORNEYS

Oct. 13, 1970   F. M. BROWN ET AL   3,533,129
BONE PINNING MACHINE

Filed Nov. 8, 1968

INVENTORS
JESSE A. WILLCOX,
FRANK M. BROWN,
JEAN A. BURTON,
GERALD L. HELGESON

BY Williamson, Palmatier
& Bains   ATTORNEYS

United States Patent Office 3,533,129
Patented Oct. 13, 1970

3,533,129
BONE PINNING MACHINE
Frank M. Brown, Jean A. Burton, and Gerald L. Helgeson, Austin, and Jesse A. Willcox, Excelsior, Minn., assignors to Geo. A. Hormel & Company, Austin, Minn., a corporation of Delaware
Continuation-in-part of application Ser. No. 572,077, Aug. 12, 1966. This application Nov. 8, 1968, Ser. No. 774,404
Int. Cl. A22c *17/04*
U.S. Cl. 17—1     10 Claims

ABSTRACT OF THE DISCLOSURE

A bone pinning process and apparatus in which a chunk of meat having articulated bones imbedded therein is engaged and clamped by a clamping medium. The chunk of meat is then shifted in a predetermined manner to align the articulated bones imbedded therein. A fitting having an elongate threaded pin is driven through one bone to threadedly engage the articulated joint between the bones. The body of the fitting is positioned exteriorly of the bones and is provided with grooves to be gripped by article engaging means on a conveyor to permit easy transfer of the fitting (while imbedded in the bone) between a conveyor and a deboning machine.

---

This is a continuation-in-part of my copending application, Ser. No. 572,077, filed Aug. 12, 1966, now Pat. No. 3,412,424 issued Nov. 26, 1968.

SUMMARY OF THE INVENTION

The present process and apparatus is adapted for use in conjunction with a deboning system wherein imbedded bones within a chunk of meat are removed from the meat. The bones are removed from each chunk of meat in such a manner that the chunk of meat remains substantially intact after the removal of the bones therefrom, and whereby the extracted bones are also maintained in an intact condition. Many of the chunks of meat that are to be deboned, have bones imbedded therein which form articulated joints. It is therefore a general object of the present invention to provide a process and apparatus for applying a fitting to the imbedded bones within a chunk of meat so that the articulated joint between the bones is immobilized.

Another object of this invention is to provide a novel bone pinning process and apparatus wherein the bone-pin fitting has a threaded pin which is threaded into the articulated joint to effectively lock the joint against movement. The body of the bone-pin fitting is arranged and constructed to permit gripping of the fitting body by a conveyor means and by deboning machine thereby facilitating automatic transfer of the fitting (while imbedded in the bone) between a conveyor and the deboning machine.

DETAILED DESCRIPTION OF THE INVENTION

Figure 1:
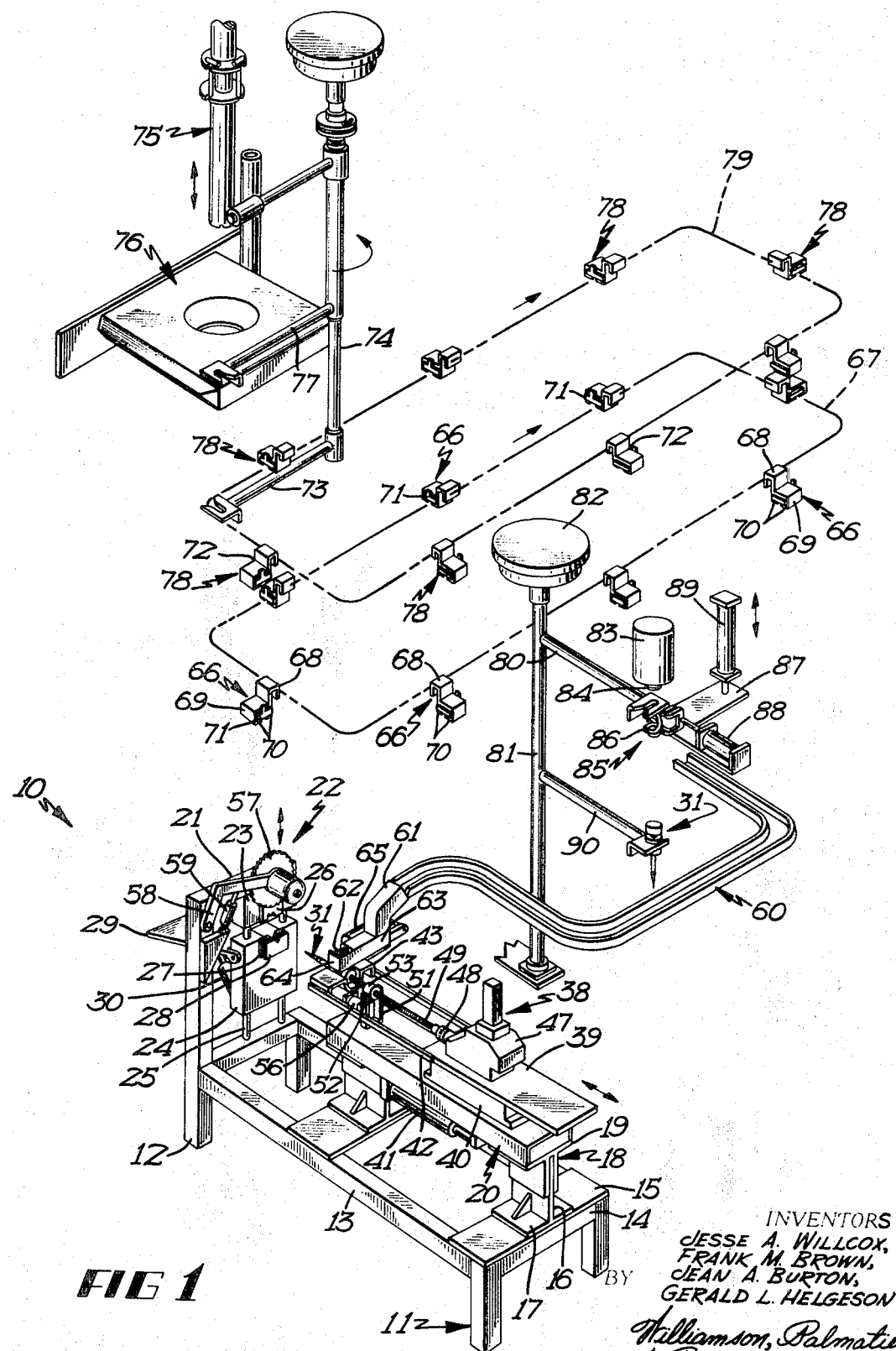
FIG. 1 is a perspective view of the bone fitting machine illustrating its manner of cooperation with a conveyor system and the deboning machine.

Referring now to the drawings and more specifically to FIG. 1, it will be seen that one embodiment of the bone pining apparatus designated generally by the reference numeral 10 is thereshown. The apparatus 10 is comprised of a base or support frame 11 which includes depending legs 12. The support frame 11 is comprised of longitudinal frame elements 13 which are rigidly interconnected to transverse frame elements 14. It will be noted that the frame is of generally rectangular configuration and that the longitudinal frame elements are interconnected by a pair of substantially flat transverse plates 15.

The support frame 11 has a pair of vertically oriented substantially flat longitudinally spaced apart support plates 16 mounted thereon, each vertical plate having a substantially flat lower plate 17 positioned upon one of the transverse plates 15 and rigidly secured thereto as by welding. Each vertical plate 16 has a generally U-shaped bracket 18 mounted thereon, the bracket being formed of a pair of spaced apart parallel bracket plates which are rigidly secured to a transverse plate 19. The transverse plate 19 of each bracket is rigidly secured to the lower surface of a generally elongate rectangular shaped table 20.

It will be noted that one of the legs 12 projects upwardly beyond the transverse and longitudinal frame elements of the support frame 11 and has an upper transverse frame element 21 rigidly secured to the upper end thereof and projecting laterally therefrom. This frame element 21 cooperates with the adjacent end of the support frame 11 to support a positioning and clamping structure 22 thereat. This positioning and clamping structure includes an upper clamping plate 23 and a lower clamping plate 24 which are aperture and vertically shiftable on guide rods 25. The upper and lower clamping plates are provided with notches, adjacent opposite edge surfaces thereof. The upper clamping plate 23 is provided with an upper clamping jaw 26 while the lower clamping plate is provided with a lower clamping jaw 27. Means are also provided for shifting the clamping plate and their associated jaws towards and away from each other. The entire positioning and clamping structure 22 is substantially identical so that shown in my co-pending application, Ser. No. 572,077, filed Aug. 12, 1966.

A vertically oriented guide plate 28 similar in configuration to the lower clamping jaw 27 is secured to the lower clamping jaw and lower clamping plate by an suitable securing means, such as bolts or the like, and is spaced from the clamping jaw so that a vertical recess is defined therebetween.

It will be appreciated that the clamping jaws in most instances will engage and clamp only one end portion of a chunk of meat to which a fitting is to be applied. In the event that the chunk of meat is a pork shoulder, such as that shown in FIG. 4, the reduced end portion of the chunk of meat will be gripped between the clamping jaws 26 and 27. Therefore means are also provided for engaging and supporting the remaining portion of the meat and this supporting means also serves to align the bones which define the articulated joint of the cut of meat.

This means includes a support and alignment plate 29 which in the embodiment shown is of substantially rectangular flat configuration and which has one edge pivotally connected to the rear surface of the lower clamping plate 24. A double acting pneumatic piston and cylinder unit 30 is provided and the cylinder thereof is pivotally connected to the rear surface of the lower clamping plate 24 at a location below the hinge axis of the support and alignment plate 29. The piston rod of this piston and cylinder unit 30 is pivotally connected to the lower surface of the plate 29 so that an operator may shift the plate from a substantially horizontal or elevated position by extension of the piston and cylinder unit to a lowered declined position by retraction of the piston and cylinder unit.

When the support and alignment plate 29 is in the elevated or substantially horizontal position, the humerus bone H of the pork shoulder S will be disposed in substantial alignment with the radius R thereof. It is pointed out that the support and alignment plate as well as the positioning and clamping structure is substantially identical to that disclosed in my copending application, Ser. No. 572,077, and a more detailed disclosure and description of the positioning and clamping structure as well as the alignment plate is felt to be unnecessary in the present application.

Figure 4:
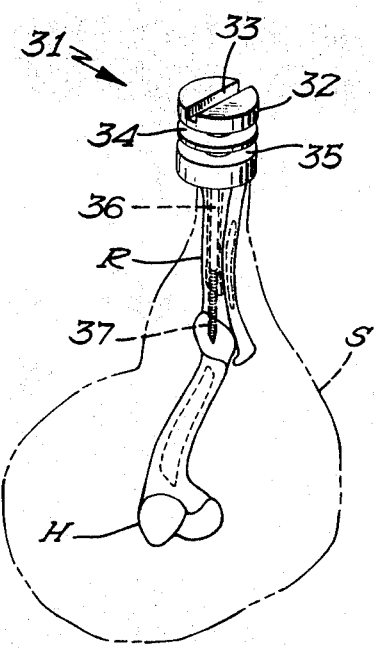
FIG. 4 is a perspective view of a chunk of meat illustrating the fitting applied to the imbedded bones thereof.
Figure 5:
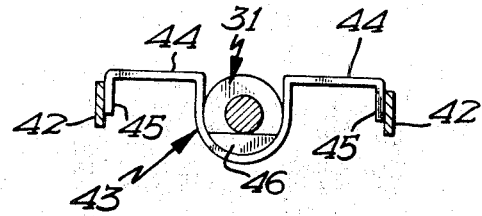
FIG. 5 is an enlarged fragmentary view illustrating the manner in which the fitting is supported on the bone pinning apparatus prior to the fitting being driven into imbedded relation within the bone.

A bone immobilizing fitting is also provided which serves to not only interlock the bones of the articulated joint in predetermined relation but also serves as a fitting to facilitate transfer of a chunk of meat to a conveyor belt, then to the deboning machine, and return of the fitting with the extracted bones affixed thereto to a removal conveyer. The fitting includes a generally cylindrically shaped fitting body 32 preferably formed of a suitable metal and having a diametrical slot 33 formed in one end thereof. The fitting body has an upper annular groove 34 formed therein and a lower annular groove 35 therein as best seen in FIG. 4. An elongate pin 36 is fixedly connected to the body and projects outwardly from that end located oppositely of the slot 33. The pin has a threaded end portion 37 which is adapted to be threaded into the articulated joint. It will therefore be seen that the bone immobilizing fitting 31 is different from that shown in my copending application.

Means are also provided for impelling a bone immobilizing fitting 31 into the articulated joint between the imbedded bones in a chunk of meat. This impeller means, designated generally by the reference numeral 38, comprises a substantially flat elongate generally rectangular shaped slide 39 which is slidably mounted upon the block type pneumatic cylinder 40. It will be noted that the cylinder 40 is mounted upon the upper surface of the table 20 and the piston rod 41 for the pneumatic cylinder 40 is connected to the lower surface of one end portion of the slide 39. The pneumatic cylinder 40 is a double acting type and is connected to a suitable source of air under pressure.

A pair of elongate spaced apart substantially parallel arms 42 are rigidly connected to the slide 39 adjacent opposite edges thereof and project longitudinally therefrom. The outer end portions of the arms 42 are rigidly connected to a U-shaped support member 43 which is provided with outturned flanges 44. Terminal depending flanges 45 integrally formed with the outturned flanges 44 and engage and are attached to the outer end portions of the arms 42.

A transversely extending guide or positioning element 46 is integrally formed with and projects upwardly from the concavity of the U-shaped support member. This guide is adapted to engage the upper annular groove 34 of the fitting body as each fitting is positioned within the U-shaped support member. This prevents axial movement of the fitting but permits revolving movement thereof. It is pointed out that, if desired, the positioning element 46 could be disposed so as to engage the lower annular groove 35 of the fitting body.

An electric motor 47 is positioned upon the slide 39 and will be connected to a suitable source of electrical current by electrical conductors. Although not shown, a switch will be provided for selectively energizing and de-energizing the motor 47. The output shaft of the motor is provided with a chuck 48 for detachable connection to one end portion of an elongate threaded shaft 49. The other end portion of the elongate threaded shaft is flattened to define a driver element of a shape and size for engagement with the slot 33 in each fitting body 32. It will therefore be seen that when the motor 47 is energized, the shaft 49 will be revolved and if the driver element 50 engages in the slot 33 of a fitting, the fitting will also be revolved.

A U-shaped support member 51 is affixed to the upper surface of the table 20 and as shown is interposed between one end portion of the table and the pneumatic cylinder 40. A nut 53 having pivot pins 52 integrally formed therewith and projecting outwardly therefrom engage the U-shaped support member 51 to pivotally support the nut for movement relative thereto. The nut 53 has an opening or bore 54 therethrough which is of generally circular configuration but extends through the nut at an angle. The inner surface defined by the bore or opening is provided with axially offset threads 55 as clearly shown in FIGS. 2 and 3.

Figure 3:
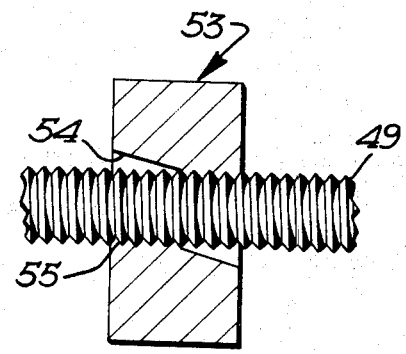
FIG. 3 is a cross-sectional detailed view similar to FIG. 2 but illustrating the elements of the impeller mechanism in a different position.

The shaft 49 projects through the opening in the nut and when the nut is in a vertical position as best illustrated in FIG. 3, the threads 55 thereof engage the threads of the shaft 49. However, when the nut 54 is tilted with respect to its U-shaped support 51 then the opening or bore 54 therethrough is larger than the external diameter of the shaft 49 so that the shaft 49 is disengaged from the threads 55 of the nut. The shaft 49 will be maintained in horizontal position regardless of the disposition of the nut 53.

Figure 2:
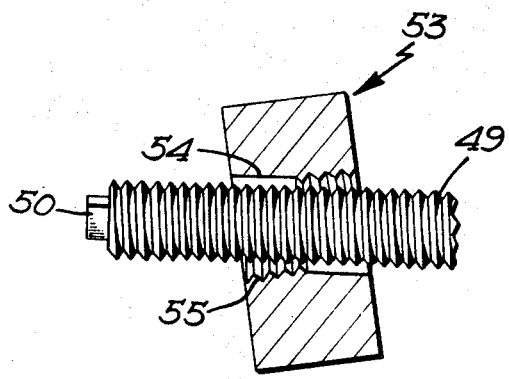
FIG. 2 is a detailed cross-sectional view illustrating co-operating elements of the impeller means, in one position.

Means are therefore provided for shifting the nut 53 between vertical and inclined positions and to this end, a double acting piston and cylinder unit 56 is provided. It will be seen that the unit is mounted on the table 20 and the piston rod thereof is connected to the nut 53. Thus by extending and retracting the piston rod, the nut may be shifted between a vertical position as illustrated in FIG. 3 to a tilted position as illustrated in FIG. 2. With this arrangement, the shaft 49 may be moved axially without simultaneously revolving the rod if the nut 53 is disposed in the tilted position. However, when the nut 53 is vertically oriented, axial movement of the shaft 49 can only be accomplished by revolving the shaft.

A power driven saw unit 57 is provided and in the embodiment shown comprises the rotary saw which is powered by a conventional motor. The power driven saw unit 57 is mounted on an arm 58 which is swingably secured to the upper transverse frame element 21 by a suitable pivot. The saw is shiftable into the guide recess defined by the lower jaw 57 and the guide plate 28 by means of a piston and cylinder unit 59. The saw is adapted to cut off the end portions of the radius-ulna bones to expose the marrow or hollow interior of these bones in preparation to applying the bone immobilizing fitting 31.

The bone immobilizing fittings 31 are sequentially fed to the bone pinning apparatus by an elongate channel shape track structure 60. This track structure is of a size to accommodate the fittting body 32 therein so that the fitting body may roll along the track from the inlet end portion thereof to the outward portion thereof. The track structure may be inclined downwardly from the inlet portion to the outlet portion to permit the bone immobilizing fittings to roll therealong by action of gravity.

The track structure has a magazine 61 secured to the outlet end thereof and this outlet magazine is adapted to feed or discharge the bone immobilizing fittings, one at a time, into the concavity of the U-shaped support member 43. Means are provided for closing the outlet 62 of the magazine and this means includes a panel 43 which is slidably mounted along one side of the magazine and which has one end thereof bent at substantially right angles thereto to define a closure element 64. The closure element 64 is of a size to obstruct the outlet 62 and the closure element is shiftable with the panel between closed and opened positions. A piston and cylinder unit 65 is provided and is connected to the panel 63 for shifting the closure element between opened and closed positions with respect to the outlet 62. It will be noted that the closure element 64 is in the opened position as shown in FIG. 1.

One of the important features of the bone immobilizing fitting 31 is the particular construction thereof which permits ready transfer of the fitting, while attached to the imbedded bones in a chunk of meat, to an article handling unit 66. It will be noted that several such article handling units 66 are secured to an endless conveyer chain 67. Each article handling unit 66 includes an inverted U-shaped arm 68 which is secured to the chain conveyer 67. Each U-shaped arm 68 is secured to a fitting engaging member 69 which is also of substantially inverted U-shaped construction but each has inturned flanges 70 formed with the legs thereof. It will be noted these flanges 70 have their innermost ends uniformly spaced apart and this spacing between these inturned flanges is of a size slightly larger than the diameter of the fitting body through the groove portion thereof. Therefore a U-shaped keeper element 71 is pivotally connected to each U-shaped arm 68 by pivot 72 for retaining the fittings in place when each fitting is positioned within U-shaped fitting engaging members 69. The conveyer chain 67 corresponds to the endless chain conveyer 176 in my copending application, Ser. No. 699,-519, filed Jan. 22, 1968, and entitled Process and Apparatus for Deboning Meat.

By engaging the upper annular groove 34 of each fitting with the fitting member 69 of each article handling unit, the fitting may be readily transferred to the infeed transfer arm 73 which is mounted on a vetrical shaft 74, the latter being revolvable about its longitudinal axis. The fitting with the chunk of meat attached thereto is then transferred from the infeed transfer arm to the spindle assembly 75 and after the bone has been extracted from the meat and pulled through the iris assembly 76, the fitting with the extracted bone attached thereto is then transferred to bone removal transfer arm 77 which is also mounted on the shaft 74 for movement therewith.

The specific construction of the infeed transfer arm 73, shaft 74, spindle assembly 75, iris assembly 76 and bone removal transfer arm are all clearly shown in my copending application, Ser. No. 699,519, and these elements do not form a part of the present invention.

Each fitting, with an extracted bone attached thereto, is then transferred to an article handling unit 78 affixed to an endless conveyer chain 79 which corresponds to an endless conveyer chain 171 in my copending application, Ser. No. 699,519. It is pointed out that the bone removal transfer arm 77 engages the lower groove 35 in each fitting so that each article handling unit will engage the upper groove 34 in each fitting as the fittings are transferred to the endless conveyer chain 79. It is pointed out that the article handling units 78 are identical in construction to the article handling units 66 of the endless conveyer 67.

The fittings with the extracted bones secured thereto will each be removed from the articles handling unit 78 of the endless conveyer chain 79 by means of a removal arm 80 which is secured to a vertically oriented revolvable shaft 81. Suitable drive means 82 are provided for revolving the shaft in the manner of the vertical shaft 74. The shaft 81 is revolved in index fashion to various positions in the manner of the shaft 74. An electric motor 83 having a fitting engaging element 84 secured to the output shaft thereof is adapted to engage the fitting and to unscrew the threaded pin 36 from threaded engagement with respect to the attached bones.

Means are provided for gripping the bones during this unthreading operation and this means includes a jaw mechanism 85 comprised of a pair of hingedly connected jaws 86 which are mounted on a bracket or plate 87. A pneumatic piston and cylinder unit 88 is connected to the jaws 86 to shift the same between open and closed positions. A second pneumatic piston and cylinder unit 89 is provided and is connected with the bracket 87 for shifting the same vertically with respect to the removal arm 80. With this arrangement, the extracted bone is pulled downwardly simultaneously during revolving movement of the fitting thus allowing the fitting to be readily unscrewed or unthreaded from the extracted bone.

A second transfer arm 90 is provided and serves to transfer the chunks of meat to which the fitting has been applied to the endless conveyer 67. An operator will remove each chunk of meat with the fitting applied thereto from the bone pinning apparatus 10 and place the same in suspended relation on the transfer arm 90. The arm will move with the vertical shaft 81 and the chunk of meat will then be transferred to the endless conveyer chain 67.

During operation of the apparatus, the chunk of meat, such as the picnic shoulder S illustrated in FIG. 4 will have its smaller or its diminished end portion thereof clamped between the upper and lower clamping jaws 26 and 27 of the positioning and clamping structure. The support and alignment plate will then be shifted to its elevated or horizontal position thus disposing the articulated connection between the radius-ulna and humerus bones. The user will then energize the power driven saw unit 57 and shift the same downwardly cutting off the distal ends of the radius-ulna bones so that the hollow interior or marrow of these bones is exposed.

The piston and cylinder unit 65 will be energized thus opening the closure element 64 and allowing a fitting 31 to be discharged from the magazine into supported relation upon the U-shaped support member 43. Thus block type pneumatic cylinder 40 will be actuated to retract the piston rod 41 thereof and to shift the slide 39 towards the positioning and clamping structure 22. During this shifting movement of the slide 39, the nut 53 will be disposed in its inclined position as illustrated in FIG. 2 thus allowing axial movement of the shaft 49 without requiring the shaft to be revolved. The fitting 31 will be retained against axial movement with respect to the U-shaped support member 43 by the guide or positioning element 46 therein.

The driver element 50 of the shaft 49 will engage in the slot 33 and after the pin 36 of the fitting has been urged into the marrow of the radius bone, the piston and cylinder unit 56 will be actuated to shift the nut 53 from the inclined position to the vertical position as illustrated in FIG. 3. The motor 47 will have been energized so that the shaft 49 will then be revolved as the slide 39 is advanced. Thus the threads of the shaft 49 will engage the threads 55 in the nut 53 so that the shaft can only be advanced by revolving the same. The pin 36 will be threaded through the articulated joint between the radius-ulna and humerus bones to immobilize the same in their aligned condition as best seen in FIG. 4. The fitting 31 will be positioned adjacent the end portion of the bone.

The motor 47 will be de-energized and the piston and cylinder 56 will be actuated to retract the same and shift the nut 53 from the position illustrated in FIG. 3 to the inclined position illustrated in FIG. 2. The cylinder 40 will be actuated to extend the piston rod 41 thus causing the slide 39 to be shifted away from the positioning and clamping structure 22. Since the nut 53 is in the inclined position, the shaft 49 may be moved axially without requiring rotation thereof.

The positioning and clamping structure will be actuated to shift the upper and lower clamping plates away from each other and the support and alignment plate 29 will be shifted to the declined position. The operator will remove the chunk of meat with the fitting applied thereto, and the chunk of meat will then be engaged by the arm 90 and swung into position for engagement by one of the article handling units 66 of the endless conveyer 67.

It will therefore be seen from the foregoing description that we have provided a novel bone pinning apparatus as well as a process which is capable of high capacity continuous operation thus permitting high volume operation of the deboning process. The novel fitting not only permits effective immobilization of the bone when applied thereto but also serves as a highly efficient means for permitting ready transfer of the chunk of meat to and from conveyer means with respect to the deboning machine and the bone pinning machine.

It will therefore be seen that we have provided a novel bone pinning apparatus and process, which is not only of simple and inexpensive construction, but which functions in a more efficient manner than any heretofore known comparable process or apparatus.

It will, of course, be understood that various changes may be made in the form, details, arrangement and proportions of the various parts without departing from the scope of my invention.

What we claim is:

1. A process for immobilizing imbedded elongate articulated bones in a chunk of meat, comprising
   engaging and clamping a chunk of meat having articulated bones imbedded therein, with a clamping medium,
   shifting said chunk of meat while engaged by the clamping medium to align the joint of the articulated bones,
   and driving an elongate pin of a fitting through one of the bones and into the other bone and through the joint between the bones to immobilize the joint.

2. The process as defined in claim 1 wherein the pin of the fitting is threaded and wherein said fitting is simultaneously revolved as it is driven into and through the articulated joint between the imbedded bones.

3. The process as defined in claim 1 wherein pressure is applied against the chunk of meat by a pressure applying medium to shift the same and to thereby align the bones at the articulated joint.

4. Apparatus for applying a fitting to imbedded bones in a chunk of meat, comprising
   releasable clamping means for clamping a chunk of meat therein,
   a fitting including a body, an elongate pin connected to said body and projecting therefrom,
   shiftable impeller means,
   fitting engaging means on said impeller means for engagement with the body of said fitting, said impeller means being shiftable in forward and return directions, and when shifted in a forward direction causing the pin to be driven into the imbedded bone of the chunk of meat.

5. The apparatus as defined in claim 4 wherein said fitting engaging means is revolvable during shifting movement of said impeller means to simultaneously revolve the fitting as it is driven into the imbedded bone of the chunk of meat.

6. The apparatus as defined in claim 4 wherein said impeller means includes an elongate shaft, means for shifting the shaft in a forward direction towards the chunk of meat and a return direction away from the chunk of meat, means for revolving said shaft when it is shifted in a forward direction to thereby revolve the fitting as it is driven into the imbedded bone of the chunk of meat.

7. The apparatus as defined in claim 6 wherein said fitting is threaded.

8. The apparatus as defined in claim 4 and a power cutting unit mounted adjacent said releasable clamping means and being operable for cutting the end of the imbedded bone in the chunk of meat to facilitate driving of the pin of said fitting into the bone and through an articulated joint defined by the imbedded bone.

9. The apparatus as defined in claim 4 wherein said impeller means includes an elongate threaded shaft, a nut having a threaded bore therethrough through which said threaded shaft projects, said nut being shiftable between a shaft engaged position and a shaft disengaged position, said nut when in the shaft disengaged position permitting the shaft to be moved axially therethrough without requiring simultaneous revolving movement of the shaft, and when in the shaft engaged position threadedly engaging the threads of the shaft and requiring said shaft to be simultaneously revolved when shifted axially therethrough.

10. The apparatus as defined in claim 4 wherein said body of each fitting has means thereon for engagement with article handling means on a conveyer whereby the chunk of meat is adapted to be suspended by the fitting from the conveyer.

References Cited

UNITED STATES PATENTS

| 3,402,423 | 9/1968 | Helgeson et al. | 17—1 |
| 3,457,586 | 7/1969 | Zwiep et al. | 17—1 |

LUCIE H. LANDENSLAGER, Primary Examiner

U.S. Cl. X.R.

17—46